No. 839,650. PATENTED DEC. 25, 1906.
J. SANDS.
MANUFACTURE OF BUILDING BLOCKS.
APPLICATION FILED MAY 19, 1906.
2 SHEETS—SHEET 1.
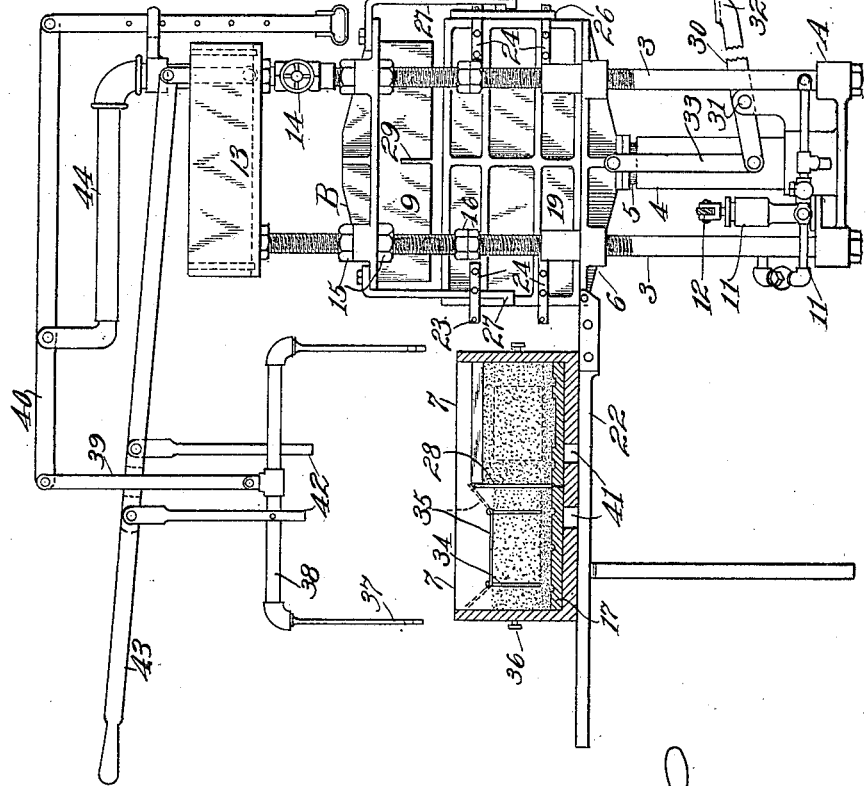
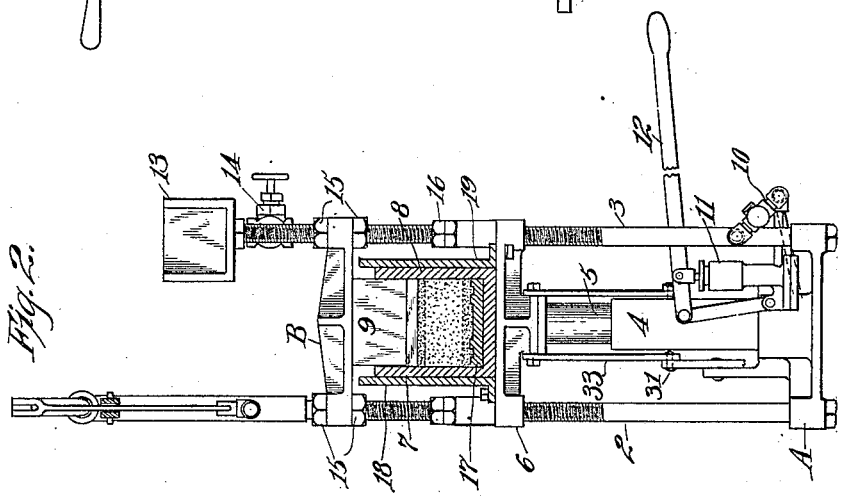
Witnesses:
Fred E. Maynard
Inventor:
John Sands;
By Geo. H. Strong
Atty.
THE NORRIS PETERS CO., WASHINGTON, D. C.

No. 839,650. PATENTED DEC. 25, 1906.
J. SANDS.
MANUFACTURE OF BUILDING BLOCKS.
APPLICATION FILED MAY 19, 1906.

2 SHEETS—SHEET 2.

Witnesses:

Inventor:
John Sands;
By Geo. H. Thorp.
Atty.

THE NORRIS PETERS CO., WASHINGTON, D. C.

UNITED STATES PATENT OFFICE.

JOHN SANDS, OF OAKLAND, CALIFORNIA.

MANUFACTURE OF BUILDING-BLOCKS.

No. 839,650.  Specification of Letters Patent.  Patented Dec. 25, 1906.

Application filed May 19, 1906. Serial No. 317,705.

*To all whom it may concern:*

Be it known that I, JOHN SANDS, a citizen of the United States, residing at Oakland, in the county of Alameda and State of California, have invented new and useful Improvements in the Manufacture of Building-Blocks, of which the following is a specification.

My invention relates to the manufacture of building-blocks and means for forming and compressing such blocks.

It consists in the combination of mechanism and in details of construction which will be more fully explained by reference to the accompanying drawings, in which—

Figure 3:
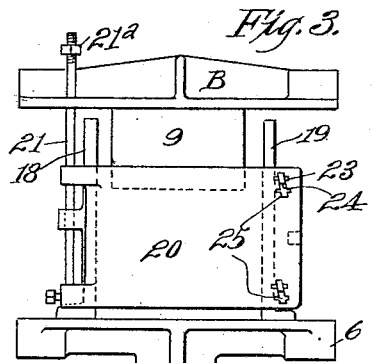
Figure 4:
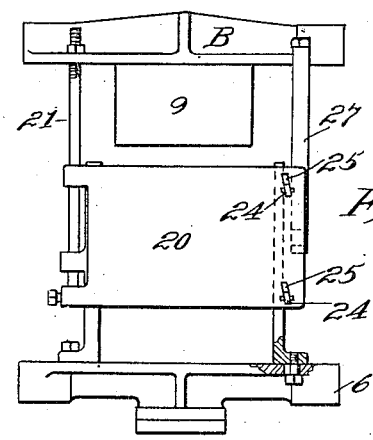
Figure 5:
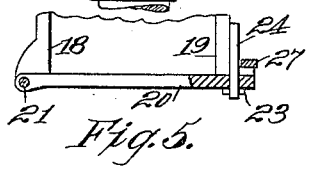
Figure 7:
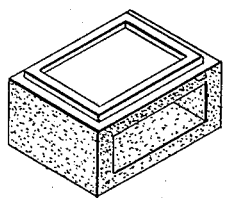
Figure 8:
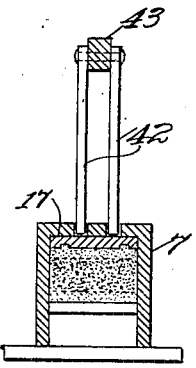
Figure 6:
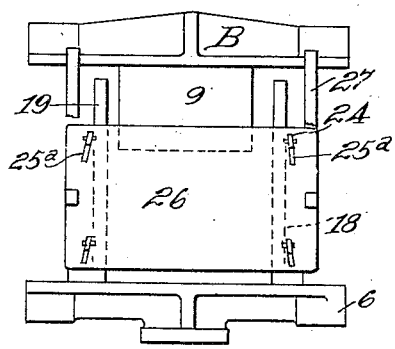
Figure 9:
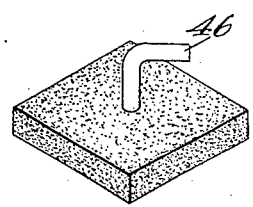

Figure 1 is a side elevation of my machine. Fig. 2 is an end elevation, partially in section. Figs. 3 and 4 show two positions of the door. Fig. 5 is a plan view, partly in section, of the same. Fig. 6 shows the end plate. Fig. 7 is a perspective view of a block. Fig. 8 shows method of extracting block. Fig. 9 shows a facing-block with locking-rod.

My invention is designed to provide an apparatus for the rapid and perfect formation of building-blocks which may be made of concrete, clay, or other material suitable for the purpose.

I have here shown a form of apparatus by which this manufacture may be carried out.
It consists of a press-frame comprising a base A and a top plate B, which are connected by vertical standards or posts 2 and 3.

Mounted upon the base-plate is a hydraulic cylinder 4, within which is a plunger 5. This plunger connects with a follower 6, and upon the follower is placed a form 7, within which is contained the mold-box 8, so that by the operation of the hydraulic press the mold after being filled with the material to be compressed is moved upward, and a plunger 9, which is fixed to the top plate B, enters the mold, and the material is compressed by the plunger when the mold is forced upward.

The front guides 3 are made tubular and are connected by pipes 10 with each other and with the pump 11, which connects with the hydraulic cylinder, so that by means of a lever 12 or other equivalent mechanism a plunger within the pump-cylinder may be operated so as to force water into the hydraulic cylinder and raise its plunger when required.

The water-supply is furnished from any suitable source. I have here shown a tank 13 conveniently mounted with relation to the machine, and one of the pipes 3 connects directly with the tank.

14 is a cock or valve by which the water-supply may be shut off at any time.

The pipes forming the standards and guides 2 and 3 are screw-threaded at the top, and by means of nuts 15 the top plate may be adjusted to any desired point with relation to the press mechanism and the mold.

The follower 6 is guided upon these posts 2 and 3, and its upward movement may be limited by nuts 16, which can be screwed down upon the threaded portion of the tubes to any desired point.

The mold-box 8 is here shown of rectangular form and is open at the top, the top being of such size that it will just slide over the stationary plunger 9 when the box is raised. A false bottom 17 may have its upper face engraved or formed with any desired surface or contour which it is desired to show upon the blocks when completed, and as many different patterns of false bottom may be used as required for different styles of block. This mold-box 8 fits into an exterior rectangular box 18, which is carried upon the follower 6, so that when the mold has been filled and has been inserted into the box the two are raised together, as previously described. One side 19 of the box is movable transversely, the object being to move this side outward sufficiently to allow the mold to be easily introduced and afterward to close the side against the mold so that it is held solidly and prevented from spreading when the compression takes place. This movement of the side is effected by means to be hereinafter described.

One end 20 of the box forms a gate, which is opened about a vertical hinge-post 21, and when thus opened it allows easy access for the introduction or removal of the mold.

For convenience I have shown a table 22, suitably hinged and supported in line with the bottom of the containing-box of the follower, so that the mold may be withdrawn upon this table or introduced into the container-box by sliding it back or forward.

When the door is closed about its hinges, it engages transverse pins 23, which are fixed in the ends of bars 24, which bars are fixed to the side of the outer mold-containing box.

The door 20 has inclined slots 25 made in it, and at the bottom of these slots are transverse slots, so that the ends of the bars 24 and the transverse pins 23 will pass through the slots when the door is closed. Then when the follower is moved upwardly the bars 24 will slide upwardly within the inclined slots 25.

The opposite end of the mold has an end 26, and this end has inclined slots 25ª, similar to those in the door; but as this end does not have to be opened I have made the inclined slots on both edges of the end, and as they are in pairs the inclination of the slots on each side will be one-half as much as the inclination of the slots in the door, so that when the follower is moved upwardly the bars 24, which project through the slots of the ends, will be acted upon simultaneously by the slots of the doors, and thus the movable side of the container 18 will be moved up close against the side of the mold-box to thus clamping it firmly in place and holding it against any spread by reason of the compression.

The independent upward and downward movement of the ends 20 and 26 is limited by stops. Thus the hinge-bar 21 is slidable with the door, and it has a stop 21ª upon its upper end which contacts with the top plate B, and a bar 27, having a hook turned at the lower end, serves at a similar stop for the outer edge of the door, and when these contacts are made the further downward movement of the follower or platen 6 will carry the locking-bars 25 and 25ª, thus moving the side of the container-box 19 outwardly and releasing the mold-box, so that it can be withdrawn. The position of the transverse pins 23 is then coincident with the transverse slots at the bottom of the slots 25, and the door 20 can then be swung open to allow the mold-box to be removed.

The mold-box may have one or more vertical partitions if it be desired to divide the block so as to make a plurality of independent blocks in each mold. Such a partition is shown at 28, and the fixed plunger-block 9 has a transverse slot or slots 29, which coincide with the plate 28. The object of this is to insure a clear cutting or subdivision of the block, since the plate being fixed in the mold and the slot in the plunger when the mold is raised the plate will hold the material out of the way and will enter the slot and insure the required division.

In order to economize time in the operation of the device, I have shown a lever 30, fulcrumed to the frame, as shown at 31, and having at the outer end a treadle 32, upon which an operator may stand.

The inner and shorter arm of the treadle-lever is connected by links 33 with the follower 6, and when the cock 14 has been opened and the weight of the person placed upon the treadle 32 it will move the follower, with the form and mold-box contained therein, upward, taking the plunger of the hydraulic cylinder with it, and thus filling the cylinder by a comparatively rapid movement. Then the cock 14 is closed, and by means of the pipes connecting with the pump-cylinder 11 the compression is effected by the operation of the lever 12, and as the pump-cylinder 11 is of comparatively small diameter in order to produce the proper power it will be seen that the amount of water needed to complete the compression will be comparatively small and but little time will be lost in finishing the work.

After the compression has been completed the cock 14 may be opened and the weight of the follower, form, and mold will be sufficient to depress the plunger in the cylinder 4, and thus force the water back into the tank 13, at the same time depressing the mold to the level and parts to a point convenient for removal upon the table 22.

The stops 16 are so adjusted upon the guide-post that the upward movement of all parts of the mold will be very even and the form of the block will be as perfect as possible.

The thickness of the blocks to be made is also regulated by these stops. If it is desired to make the blocks hollow, I employ thin metal boxes 34, having covers 35, which may be opened and closed. These boxes extend transversely across the mold-box, just filling it from side to side, there being no ends to the box, as the sides of the mold-box form a closure for them. These boxes are of the size of the opening which it is desired to make through the block.

The mold-box is first filled with concrete to a point sufficiently deep to form the thickness of one of the sides of the block. Then the hollow box 34 is inserted, and it may be filled with dry sand and the covers 35 closed. The concrete is then tamped in around the box up to the level of the top, and the box may then be lifted out, leaving the rectangular body of sand with which it is filled occupying the space which is to form the hollow cavity. The remaining portion of the mold-box is then filled with concrete tamped upon the top of the sand, and the mold then being introduced into the press the compression will act about equally upon the sand and the concrete without displacing the sand. After the block has been removed from the mold the sand will easily shake out, leaving the hollow interior space.

In order to conveniently handle the mold-box, I have shown pins 36, projecting from the ends of the box, and hook-links 37 are carried by a cross-bar 38 in such position that they may be let down to connect with the pins 36.

The cross-bar 38 is connected by a rod 39 with a fulcrumed lever 40, having a convenient handle by which it may be operated, so that when the hooks 37 have been attached to the pivot-pins 36 the box may be raised from the table 22 and turned over.

The bottom of the box has holes made through it, as shown at 41, and when reversed these holes will be exposed at the top. In line above these holes are two push-bars 42, connected with a lever 43, which is suitably fulcrumed, as shown. By means of this lever 43 the push-buttons 42 are inserted into the holes 41 and press against the movable facing-mold 17, which occupies the bottom of the box, thus holding the bottom of the block against the surface of the table 22. Then by means of the lever 40 the suspending-links 37 and the mold-box are lifted, thus leaving the block lying intact upon the table and ready for removal. In this manner I insure the removal of the block without breaking corners or damaging it. For convenience in handling this mechanism I have shown one of the posts 2 continued upwardly and carrying a swiveled arm 44, upon the upturned end of which the lever 40 is fulcrumed, and the lever 43 is also carried by a collar upon the swiveled portion, so that all these parts may be turned around and out of the way when desired.

It will be understood by the foregoing that blocks of any size and thickness may be manufactured in this manner.

If the facing-blocks are made with ornamental surfaces, I may introduce rods 46 into the mold, so that one end will be embedded in the material of which the block is formed.

The rods may be folded down upon the back of the concrete while the compression takes place and can afterward be bent upward and have the ends bent into hook or other form, so that when the thin facing-blocks are set up and a filling of ordinary concrete placed behind the blocks this concrete filling will surround and embed the tie-rods, thus holding them firmly in place.

Having thus described my invention, what I claim, and desire to secure by Letters Patent, is—

1. An apparatus for the formation of blocks from plastic material, said apparatus comprising a mold-box, a vertical partition therein, a container having a side which is movable to and from the mold side, said container having ends and means whereby the ends are given an independent movement to cause the movable side of the container to approach or recede from the contained mold, a fixed plunger having a slot registering with the mold-partition, and means for moving the mold-box over the plunger.

2. An apparatus for the manufacture of blocks from plastic material, said apparatus comprising a mold-box having a removable facing-plate, a partition fixed transversely of the box, a container for the mold-box, said container having ends and a movable side, means whereby said ends are allowed a movement independent of the container and caused to advance or retract the movable side of the container relative to the mold, a fixed plunger having means registering with and receiving said partition, and means for moving the mold-box over the plunger.

3. In an apparatus for forming blocks from plastic material, a mold-box into which the material is placed, a container into which the mold-box is fitted, said container having an independent side, means including movable ends for the container and interengaging inclined members between said ends and the independent side of the container, by which said side is moved outwardly to admit the mold-box, and moved inwardly to clamp the box, and a mechanism whereby the material is compressed within the mold.

4. In an apparatus for forming blocks from plastic material, a mold, a container for the mold, said container having a movable side, ends for the container, said ends having inclined slots made through them, bars projecting from the ends of the movable side adapted to enter the slots, mechanism by which an independent movement of the container and the end gates takes place whereby the bars move in the inclined slots to advance or retract the movable side.

5. In an apparatus for the formation of blocks from plastic material, a mold-box, a container having an independent movable side, a plunger fixed in line with the open side of the mold, a compressing mechanism by which the mold is moved with relation to the plunger, end plates for the container having inclined slots, locking-bars projecting from the movable side adapted to enter the slots, and means for moving the end plates independently of the container whereby the movable side is caused to approach or recede from the contained mold.

6. In an apparatus for forming blocks from plastic material, a mold-container, a transversely-movable side having bars projecting from the ends, container end plates having diagonal slots with which the bars interlock, said plates having a vertical movement whereby the inclines act to move the side plate, and stops whereby the movement of the end plates is limited.

7. In an apparatus for the formation of blocks from plastic material, a mold having perforations in the bottom and removable facing-block fitting therein, pivot-pins projecting from the ends of the mold, means for raising and suspending the mold to reverse upon said pins, pressure-bars adapted to enter the holes in the bottom of the mold and to press upon the facing-plate, and mechanism by which a pull is exerted upon the mold through its suspending-pins to remove it from the finished block.

8. In an apparatus for the manufacture of blocks, a mold having holes in the bottom, a removable facing-block fitting over the holes, swivel-pins, a yoke and hangers from which the mold may be suspended and reversed, bars adapted to enter the holes and press upon the bottom of the face-plate to hold the finished block down, a lever mechanism by which the mold may be disengaged from the block and face-plate, and a swivel mechanism upon which said devices are carried.

9. In an apparatus for the manufacture of blocks from plastic material, a mold, and means for making a hollow space within the block, said means comprising a thin metal open-bottomed form fitting transversely in the mold upon a primary layer of the concrete, and about which the plastic material is filled to a level with the top, said form having open ends which are closed by the sides of the mold-box, and having a cover which may be opened and closed, said form being filled with sand, and afterward withdrawn, and the mold then filled with plastic material to complete the block above the sand.

10. In an apparatus for the manufacture of building-blocks from plastic material, a mold, a container having sides movable to and from the mold sides, ends with inclined slots, pins projecting from the container sides to enter the slots, and means for moving the container independently of the ends to close the container side against the mold.

11. In an apparatus for the manufacture of building-blocks from plastic material, a mold, a container having sides movable to and from the mold sides, ends with inclined slots, pins projecting from the container sides to enter the slots, means for moving the container independently of the ends to close the sides against the mold, and stops whereby the independent movements of the ends are limited.

12. In an apparatus for the manufacture of blocks from plastic material, a mold, a container having sides, one of which is movable to and from the mold sides, a fixed and a hinged end gate, each gate having angular slots made therein, pins projecting from the movable container side adapted to enter said slots, a fixed plunger, means for moving the mold and container upwardly so that the plunger enters the mold, guides upon which the end plates are slidable independently of the movement of the mold whereby the movable container side is compressed against the mold, and stops limiting the movement of said ends.

13. In an apparatus for the manufacture of blocks from plastic material, a mold, a container having a side movable to and from the mold side, end gates for the container having inclined slots, pins projecting from the movable container side adapted to enter said slots, a plunger fixed above the mold, means by which the molds and container are raised to insert the plunger into the mold and compress the contents, guides upon which said end gates are slidable, said gates remaining stationary, while the container and mold are raised until they are locked together, said end gates being subsequently movable upwardly in unison with the movement of the container.

14. In an apparatus for the manufacture of blocks from plastic material, a mold-box, a container-box having one side movable to compress or release the mold-box, a plunger fixed above and in line with the mold-box, mechanism for raising and depressing the mold with relation to the plunger, ends for the container-box having inclined slots, one of said ends being hinged and adapted to open to expose the mold-box, pins projecting from the movable side of the container-box and entering the inclined slots of the ends, guides upon which the two ends are slidable independently of the container-box whereby the side is compressed against the mold or released therefrom by opposite movements of the apparatus.

In testimony whereof I have hereunto set my hand in presence of two subscribing witnesses.

JOHN SANDS.

Witnesses:
W. H. H. GENTRY,
F. Y. STEIGER.